United States Patent
Thompson et al.

(10) Patent No.: US 7,133,960 B1
(45) Date of Patent: Nov. 7, 2006

(54) LOGICAL TO PHYSICAL ADDRESS MAPPING OF CHIP SELECTS

(75) Inventors: Derek A. Thompson, Portland, OR (US); Darrell S. McGinnis, Hillsboro, OR (US); Steve A. McKinnon, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 448 days.

(21) Appl. No.: 10/749,464

(22) Filed: Dec. 31, 2003

(51) Int. Cl.
*G06F 12/06* (2006.01)
(52) U.S. Cl. .......................................... 711/5; 711/105
(58) Field of Classification Search .................... 711/5
See application file for complete search history.

(56) References Cited

U.S. PATENT DOCUMENTS

| | | | |
|---|---|---|---|
| 6,754,797 B1 * | 6/2004 | Wu et al. .................... | 711/202 |
| 6,836,818 B1 * | 12/2004 | Sandorfi ..................... | 711/104 |
| 2003/0128596 A1 * | 7/2003 | Peterson et al. ....... | 365/189.11 |

* cited by examiner

*Primary Examiner*—Gary Portka
*Assistant Examiner*—Shane M. Thomas
(74) *Attorney, Agent, or Firm*—Troutman Sanders LLP; Jeffrey L. Waters

(57) ABSTRACT

In some embodiments, a system and method for mapping the logical chip selects to a physical chip select. A chip select remapping unit receives logical chip select associated with a dual in-line memory module. The chip select remapping unit converts the logical chip select vector through a redirection table that maps the logical memory ranks to available physical memory ranks.

11 Claims, 3 Drawing Sheets

LOGICAL TO PHYSICAL ADDRESS MAPPING OF CHIP SELECTS

BACKGROUND

Current Memory Controller Hubs (MCHs) may be capable of supporting two memory channels, each of which may have up to four memory devices. The memory devices used in current computer systems may be memory modules packages, such as dual in line memory modules (DIMMs) or in the case of older computer systems the memory modules may be dynamic random access memories (DRAMS). Within each memory channel, a memory controller may populate the DIMMs in a specified order using a linear memory map. The memory control starts populating the memory modules starting with the memory module in the DIMM socket physically located farthest from the MCH on the channel. For example, if the DIMM sockets are numbered from 0 to 3, with the DIMM#3 being farthest from the MCH, the memory module in the DIMM#3 is populated first. Once the memory module in DIMM#3 is fully populated, then the next DIMM, DIMM#2, will be populated next, and so on. This places the load on the DIMMs as far from the MCH as possible. Because current memory controllers use memory addresses that are relative to a linear memory map and the physical memory arrangement of the DIMM is also linear, there is a one-to-one correspondence between the memory map and the physical memory arrangement.

DETAILED DESCRIPTION OF THE EMBODIMENTS

Figure 1:
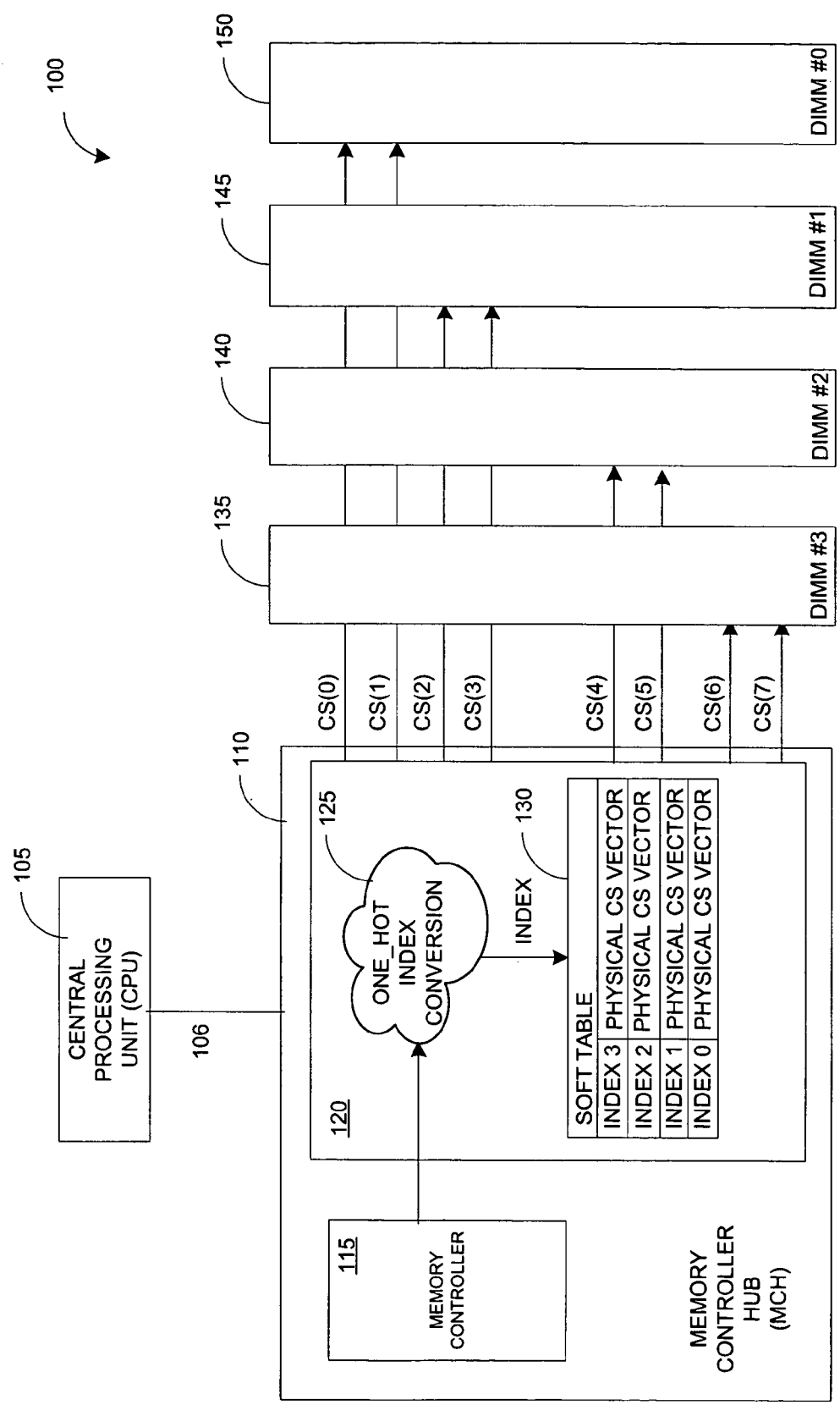
FIG. 1 is block diagram illustrating a system for converting logical chip selects to physical chip selects according to some embodiments of the present invention.

Referring to the figures, in which like numerals refer to like elements through the several figures, FIG. 1 is a block diagram illustrating a computer system 100 in accordance with some embodiments of the present invention. The computer system 100 contains at least one central processing unit (CPU) 105. For purposes of the this application, the computer system 100 may be described as having only one CPU 105, however, those skilled in the art will appreciate that the computer system 100 may support multiple CPUs without departing from the scope of the embodiments of the invention. In the exemplary embodiment, the CPU 105 may be connected to a memory controller hub (MCH) 110 through a data bus 106, such as a three-load front side bus operating at 167 mega hertz (MHz). The MCH 110 may support four dual in-line memory modules (DIMMs) 135, 140, 145, and 150, such as DDR266, DDR333, or DDRII-400 memory modules or any combination thereof.

The MCH 110 may contain a memory controller 115, which may be a double data rate (DDR) memory controller for direct-connection to a channel containing four DIMM devices. The memory controller 115 may perform a background data transfers between the locations in the DIMM memory modules 135, 140, 145, and 150, or from the memory modules in the DIMM memory modules 135, 140, 145, and 150 to a memory-mapped input/output (I/O) destination. The memory controller 115 may receive a logical address from the CPU 105 for data stored in or to be written to one of the DIMMs 135, 140, 145, and 150. The memory controller 115 may use a standard, predefined logic to fill the DIMMs 135, 140, 145, and 150 according to the logical address. For example, the memory controller 115 may populate DIMM #0 150 first, which is located farthest from the MCH 110. When all of the memory locations are filled in DIMM#0 150, the memory controller 115 may begin to fill the memory locations in the DIMM#1 145. Thus, a logical a chip select vector may be used to fill the DIMM memory modules in a sequential manner starting with the DIMM memory module farthest from the MCH 110. In one embodiment, the logical chip select vector is an array of all logical chip select bits.

However, DIMMs 135, 140, 145, and 150 may be either single ranked or dual ranked and the MCH 110 should be able to handle both types. Therefore each DIMM 135, 140, 145, and 150 may be addressable by two chip selects (CS). In the exemplary embodiment, DIMM#0 150, which is the farthest DIMM from the MCH 110, may be activated by CS(0), which may control the first rank and CS(1), which may control the second rank. Similarly, DIMM#1 145, which is the second farthest DIMM from the MCH 110, may be accessed by CS(2), which may control the first rank and CS(3), which controls the second rank. Likewise, DIMM#3 140 may be activated by CS(4), which controls the first rank and CS(5), which controls the second rank of DIMM#3 140. Finally, DIMM#4 135, which is the closest DIMM to the MCH 110, may be accessed by CS(6), which controls the first rank and CS(7), which controls the second rank of the DIMM.

The memory controller 115 transfers the logical CS vector to a Chip Set Remapping Logic Unit 120. The CS Remapping Logic Unit 120 takes the logical CS vector and generates an index value to lookup a corresponding physical CS vector. The logical vector may be a one-hot encoded vector since any given memory transaction has a single physical target. The CS Remapping Logic Unit passes the logical CS vector through a one-hot index conversion process to generate an index value. The index values may be a sixteen (16) bit value, which may be used to access an appropriate physical CS vector from a soft table 130. The soft table 130 is accessible to the BIOS, and may be programmed to accommodate a number of different memory configurations. Each entry may contain the mapping definition for the logic to follow. To this end, each entry in the soft table 130 represents the physical CS vector to assert when that particular entry is selected by a particular index.

In another embodiment, the logical to physical mapping technique may be used for mirroring. Mirroring allows one half of the populated memory to be designated as mirrored, or redundant data, thereby providing on-line recovery of damaged data, even from unrecoverable errors. Mirroring may support either one or two pairs each of primary and mirror memory components, which may be located at the DIMM sockets 135, 140, 145, and 150.

When mirroring is enabled, the CS Remapping Logic Unit 125 ensures that a full copy of the data resides in both the primary memory module and the mirror memory module. Additionally, for mirroring, the same data is stored in two separate memory modules located in adjacent DIMM sockets. If more than one memory channel is present, the data may be written on both the primary memory module and the mirrored memory module on each memory channel. This enables dynamic fail-down via configuration register control to single-channel operation while retaining 144-bit error correction coding (ECC) in order to "hot swap" victim memory modules from the off-line memory channel.

As an example of mirroring, DIMM#0 150 and DIMM#1 145 may be a first mirrored memory module pair, with the DIMM#0 150 holding the primary memory module and the DIMM#1 145 holding the mirrored memory. It should be noted that the mirror memory module should be at least the same size as the primary memory module. Therefore, the DIMM#0 150 and DIMM#1 145 may hold a memory component of X bytes each. Furthermore, suppose that an additional pair of mirrored memory modules were added to the computer system 100. The additional primary-mirror memory module pair does not have to be the same size as the first primary-mirror memory module pair. Therefore, DIMM#2 140 and DIMM#3 135 may each hold a memory component of Y bytes. Thus, the first or lowest memory module may be located in DIMM#0 150 and the second memory module may be located in the DIMM#2 140. The MCH 110 does not recognize the mirror memory modules in DIMM#1 145 or DIMM#3 135. However, the logical CS vector may address the memory starting at DIMM#0 150. Once the memory module is full, the MCH 110 will try and place the data in the memory module at the DIMM#1 socket using the appropriate logical CS vector. However, since DIMM#1 contains the mirrored memory of the primary memory in DIMM#0 150, any attempt to write to the DIMM#1 may lead to an error. Therefore, prior to sending the data out to the DIMMs, the CS Remapping Logic Unit 120 may convert the logical CS vector, which controls to DIMM#1 145, to a physical CS vector that controls DIMM#2 140. As a result, the DIMM#2 140 may be populated with the additional data.

Figure 2:
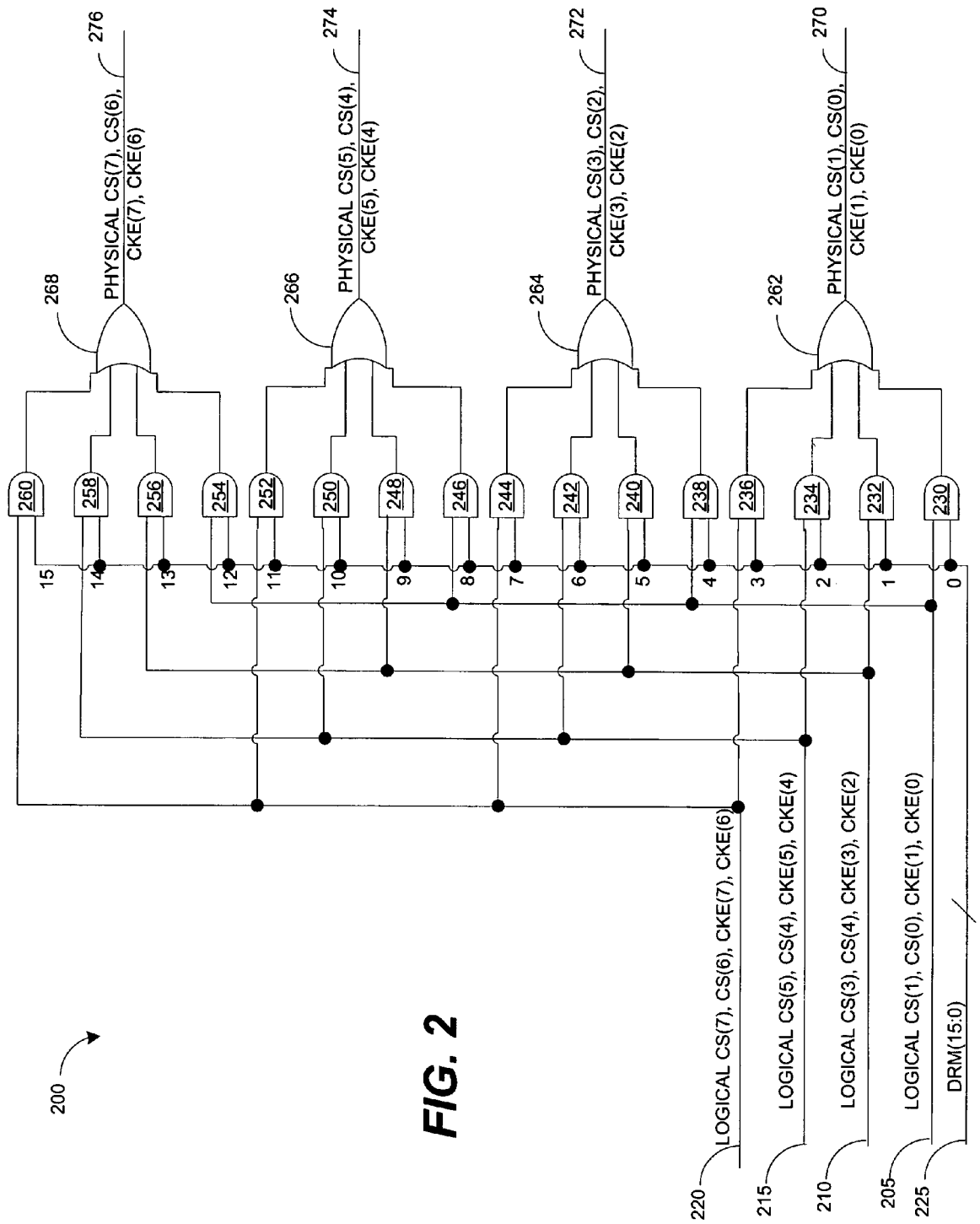
FIG. 2 is a block diagram illustrating a logic circuit for converting logical chip selects to physical chip selects according to some embodiments of the present invention.

FIG. 2 is an illustration of an exemplary embodiment of a logic circuit 200 that may perform the logical to physical mapping of the chip selects. The circuit 200 may contain four input lines 205, 210, 215, and 220, which represent the logical CS inputs. In an exemplary embodiment, the input 205 may contain the chip selects CS(0) and CS(1) for a dual ranked memory device that may be plugged into the DIMM#0 socket 150 (FIG. 1). The input 205 may also contain the clock enables CKE(0) and CKE(1) for the CS(0) and CS(1), respectively. The input line 210 may contain the chip selects CS(2) and CS(3) for a dual ranked memory device that may be plugged into the DIMM#1 socket 145 as well as clock enable signal CKE(2) and CKE(3) for the CS(2) and CS(3) signals, respectively. Similarly, the input line 215 may contain the chip selects CS(4) and CS(5) for a dual ranked memory device that may be plugged into the DIMM#2 socket 140 as well as clock enable signal CKE(4) and CKE(5) for the CS(2) and CS(3) vectors. Additionally, input line 220 may contain the chip select vectors CS(6) and CS(7), which correspond to a dual ranked memory device that may be plugged into the DIMM#1 socket 135 as well as clock enable signal CKE(6) and CKE(7) for the CS(6) and CS(7) signals, respectively. Further, the logic circuit 200 may also contain a control DRM(15:0) 225, which may be a 16-bit input signal.

The logic circuit 200 may also contain a number of logical AND gates, which may be connected to the inputs 205, 210, 215, and 220. In an exemplary embodiment, the logic circuit may contain 16 logical AND gates 230, 232, 234, 236, 238, 240, 242, 244, 246, 248, 250, 252, 254, 256, 258, and 260.

Each of the input signals 205, 210, 215, and 220 may serve as one input to four separate logical AND gates. For example, input 205, may be mapped to logic AND gates 230, 238, 246, and 254, input 210 may be mapped to logic AND gates 232, 240, 248, and 256, while input 215 may be mapped to logic AND gates 234, 242, 250, and 258, and input 220 may be mapped to logic AND gates 236, 244, 252, and 260. The second input for each of the logic AND gates may be one of the 16 input lines 225.

The output of four consecutive logical AND gates may then be input to at least one logical OR gate. The output of each logical OR gate may be the physical chip select vectors and CKE signals that may identify the physical DIMMs. For example, in an exemplary embodiment the logical AND gates 230, 232, 234, and 236 may be input to the logical OR gate 262, whose output 270 may be the physical chip select vectors CS(0) and CS(1), and clock enable signals CKE(0) and CKE(1), which may be used to access DIMM#0 150 (FIG. 1). Additionally, the output of logical AND gates 238, 240, 242 and 244 may be input to the logical OR gate 264, whose outputs 272 may be the physical chip select vectors CS(2) and CS(3) and the physical clock enable signals CKE(2) and CKE(3) for DIMM#1 145 (FIG. 1). Likewise, the output of logical AND gates 246, 248, 250 and 252 may be input to the logical OR gate 266, whose outputs 274 may be the physical chip select vectors CS(4) and CS(5) and the physical clock enable signals CKE(4) and CKE(5) for DIMM#2 140 (FIG. 1). Further, the output of logical AND gates 254, 256, 258 and 260 may be input to the logical OR gate 268, whose outputs 276 may be the physical chip select vectors CS(6) and CS(7) and the physical clock enable signals CKE(6) and CKE(6) for DIMM#3 135 (FIG. 1).

The operation of the logical circuit may be controlled by the DRM(15:0) signal 225, which may be a 16-bit signal. When the appropriate bit of the DRM(15:0) signal 225 is set, the logical AND gate that may have the logical chip select vector as an input is driven to an "ON" state. The output of the logical AND gate may then be sent to the appropriate logical OR gate, which in turn may set the physical chip select vector. The operation of the logical circuit may best described in terms of an example. Returning now to the example of the mirror memory, the primary memory module of the second mirrored memory pair may be located at DIMM#2 140, which is controlled by the chip select vector CS(4). Additionally, for the purpose of this example, it will be assumed that the DIMMs may be single ranked, and therefore, only the chip select vectors CS(0), CS(2), CS(4), and CS(6) may be used to access DIMM#0 150, DIMM#1 145, DIMM#2 140, and DIMM#3 135, respectively. Because the MCH 110 may be attempting access the second primary memory module, which the MCH 110 believes is at DIMM#1 145, the MCH 110 may activate the logical chip select vector CS(2) 210, which has a one-to-one correspondence with DIMM#1 145. Chip select vector CS(2) 210 may appear at one of the inputs or logical AND gate 232, logical AND gate 240, logical AND gate 248, and logical AND gate 256. The Chip Select Remapping Logic Unit 120 may then generate a DRM signal 225 that controls which of these logical AND gates may generate an output. Because the Chip Select Remapping Logic Unit 120 may be programmed for mirroring, a DRM signal 225 may be generated that sets the ninth bit to a logical "ON" state, which may correspond to the logical AND gate 248. This may cause the output of the logical AND gate 248 to transition to an "ON" state. The output of the logical AND gate 248 in turn may lead into an input of the logical OR gate 266 which may cause the output of the logical OR gate 266 to transition to an "ON" state, which may generate the physical chip select vector CS(4) 272 and the clock enable signal CKE(4), which may allow data to be written into the memory module in DIMM#2 140. Thus, the operation of mapping the logical chip select vector to a physical chip select vector may be transparent to the MCH 110 as it may be performed just prior to sending the chip select signal to the memory modules. Additionally, because mirroring requires storing data redundantly in a mirrored memory module, the Chip Select Remapping Logic Unit 120 also may set the thirteenth bit of the DRM(15:0) signal 225 to a logical "ON" state. This in turn may set the output of the logical AND gate 256 to an "ON" state. The output of the logical AND gate 256 may be connected to one of the inputs of the logical OR gate 268. The output of the logical AND gate 256 may cause the output of the logical OR gate to transition to an "ON" state, which may generate the physical chip select vector CS(6) and the clock enable signal CKE(4) 276, which may allow data to be redundantly written into the mirrored memory module in DIMM#2 140.

Because the logical chip select vector may be mapped into more than one physical chip select, the mapping function may be used for debugging data. For example, the memory module at DIMM#3 may be replaced with a logic analyzer. Thus, whenever data may be written to a memory module the data may simultaneously be sent to the logic analyzer to determine whether the data being written is corrupt or damaged.

Figure 3:
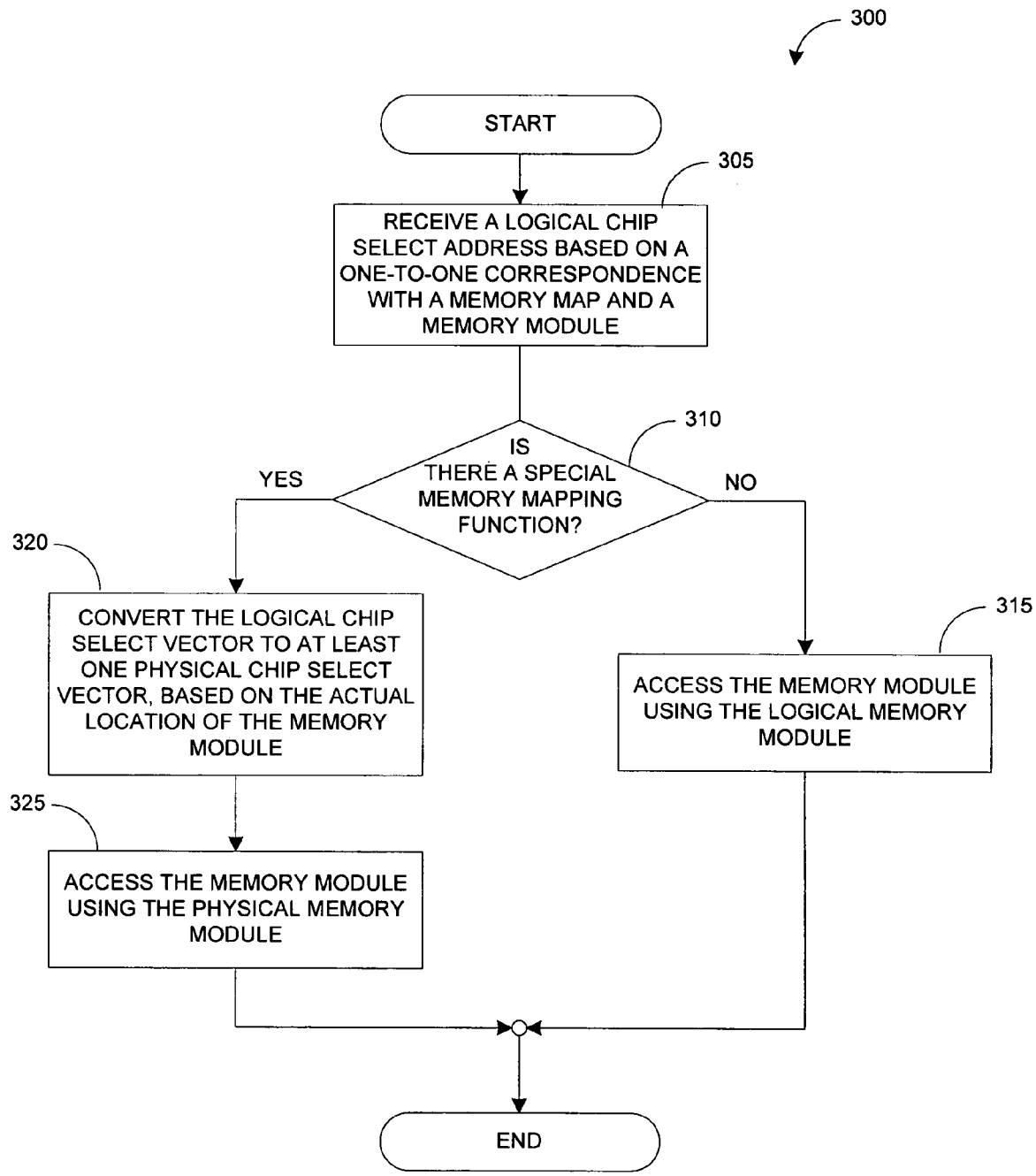
FIG. 3 is a logic flow diagram illustrating a routine for converting logical chip selects to physical chip selects according to some embodiments of the present invention.

FIG. 3 is a logic flow diagram illustrating a method 300 for converting logical chip selects to physical chip selects. Method 300 begins at 305, in which one logical chip select vector may be received. The logical chip select vector may be based on a one-to-one correspondence between a memory map within the memory controller 115 and the linear arrangement of the DIMMs 135, 140, 145, and 150. In an exemplary embodiment, the method 300 may support one-hot encoding, that is, only one chip select may be active at any given time. Therefore, only one logical chip select vector may be received at any given time. However, those skilled in the art will appreciate the method may be modified so that more than one chip select may be active at any given time without departing from the scope of the embodiments of the invention.

At 310, the determination may be made whether a special memory mapping function may be required. Memory mapping function are those functions in which there may not be a one-to-one correspondence between the memory map and the physical location of the DIMMs. Examples of special memory mapping functions may include, but are not limited to mirroring, use of dual rank memory modules, mixing of single and dual rank memory modules, use of a memory analyzer, and the like. If the determination is made that there are no special memory mapping functions, which may represent the "default" case, then the "NO" branch may be followed to 315, in which no conversion of the chip select vector may be performed and the logical chip select vector is used to access the memory module.

However, if the determination is made that a special memory mapping function is required, then the "YES" branch may be followed to step 320, in which the logical chip select vector may be passed to a Chip Select Remapping Logic Unit 120, which may convert the logical chip select vector to at least one physical chip select vector, which may correspond to the actual location of the memory module rank on the system circuit board. In one embodiment, the Chip Select Remapping Logic Unit 120 may take the logical chip select vector (assuming one-hot encoding) and may generate an index to lookup a new physical chip select vector in a look up table. The logical vector may be assumed to be a one-hot encoded vector since any given memory transaction may have a single physical target.

At 325 the physical chip select vector may be used to map the logical chip select vector to more than one physical chip select for mirroring, memory debug, and other special memory mapping functions where the data may be mapped to more than one physical memory module.

Other alternative embodiments will become apparent to those skilled in the art to which an exemplary embodiment pertains without departing from its spirit and scope. Accordingly, the scope of the present invention is defined by the appended claims rather than the foregoing description.

We claim:

1. A method comprising:
   receiving an address comprising a logical chip select vector for at least one memory module;
   converting the logical chip select vector to a corresponding physical chip select vector associated with a physical location of the at least one memory module that is different than the logical chip select vector; and
   accessing the memory module using the physical chip select vector, wherein converting the logical chip select vector to the physical chip select vector, comprises:
   determining at least one index from the logical chip select (CS) vector; and
   retrieving a physical chip select vector associated with the index from a table comprising a plurality of physical chip select vectors.

2. The method of claim 1, wherein converting the address of the logical chip select vector to the physical chip select vector, further comprises:
   mapping the physical chip select vector to a first memory module; and
   mapping the physical chip select vector to a second memory module.

3. The method of claim 1, wherein the memory module is a dual in-line memory module (DIMM).

4. The method of claim 1, wherein the memory module is a dynamic access random access memory (DRAM).

5. A system, comprising:
   a memory controller operable to generate a logical chip select vector based on a one-to-one relationship between a memory map and a plurality of memory modules;
   at least one physical chip select vector corresponding to the plurality of memory modules;
   a chip select remapping unit operable to convert the logical chip select vector to a physical chip select vector,
   wherein the physical chip select vector is operable to allow the memory controller to access memory modules, wherein the chip select remapping unit comprises:
   an index conversion unit operable to generate at least one index based on the logical chip select vector; and
   a table comprising a plurality of physical chip select vectors, wherein each physical chip select vector is associated with at least one index and identifies the physical location of at least one memory module.

6. The system of claim 5, further comprising a central processing unit operable to instruct the memory controller to access at least one of the memory modules.

7. The system of claim 5, wherein the chip select remapping unit is further operable to:
   use the physical chip select vector to map the logical chip select vector to a first memory module; and use the physical chip select vector to map the logical chip select vector to a second memory module.

8. The system of claim 7, wherein the memory module is a dual in-line memory module (DIMM).

9. A chip select remapping unit, comprising:
- an index conversion unit operable to generate at least one index based on a logical chip select vector; and
- a table comprising a plurality of physical chip select vectors, wherein each physical chip select vector is associated with at least one index and identifies a physical location of at least one memory module.

10. The chip select remapping unit of claim 9, further operable to:
- map the physical chip select vector to a first memory module; and
- map the physical chip select vector to a second memory module.

11. The chip select remapping unit of claim 9, wherein the at least one memory module is a dual in-line memory modules (DIMMs).

* * * * *